F. HANSON.
Insect and Vermin Fumigator.
No. 200,529. Patented Feb. 19, 1878.
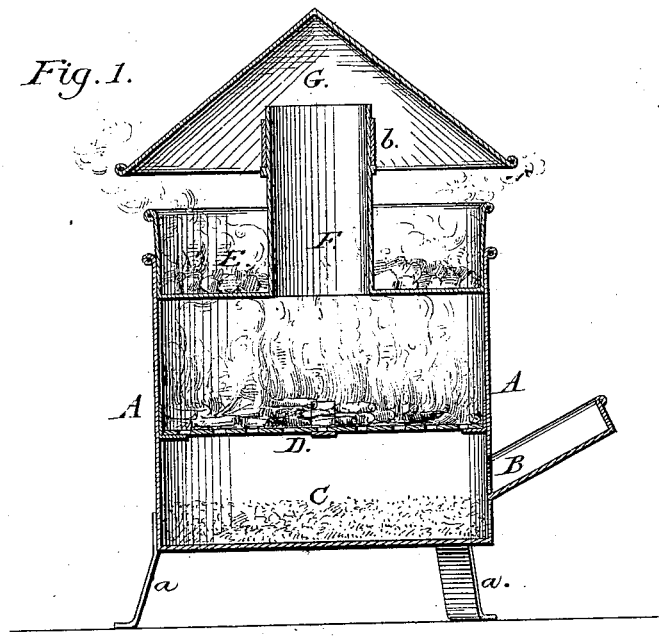
Witnesses:
George Carson
W. W. Heaton
Inventor:
Francis Hanson
By Parker & Sweet Jr. & Co. attys

UNITED STATES PATENT OFFICE.

FRANCIS HANSON, OF NEVADA CITY, CALIFORNIA, ASSIGNOR OF ONE-HALF HIS RIGHT TO MILTON GREEN, OF SAME PLACE.

IMPROVEMENT IN INSECT AND VERMIN FUMIGATORS.

Specification forming part of Letters Patent No. 200,529, dated February 19, 1878; application filed December 12, 1877.

*To all whom it may concern:*

Be it known that I, FRANCIS HANSON, of Nevada City, in the county of Nevada and State of California, have invented certain new and useful Improvements in Insect and Vermin Fumigators; and I do hereby declare that the following is a full, clear, and exact description thereof, which will enable others skilled in the art to which it appertains to make and use the same, reference being had to the accompanying drawing, and to letters of reference marked thereon, which form a part of this specification.

My invention has for its object to provide an apparatus for exterminating bed-bugs, fleas, cockroaches, and other vermin which inhabit dwellings of all kinds; and it consists of a small furnace provided with a suitable fire-pan, an open tray above to hold the combustible substances for creating fumes for destroying the vermin, and an overhanging hood or cap to prevent the escape of sparks, all as will be hereinafter more fully described, and pointed out in the claim.

Referring to the drawing, the figure represents a vertical longitudinal section of my invention.

Similar letters of reference indicate like parts.

A represents the main body of my apparatus, supported upon legs $a$, and provided with a draft-opening, B, and an ash-box, C, directly above which is secured, in suitable bearings, a perforated plate, D, for holding the fire used in the operation of my invention. In place of the perforated plate D, however, any suitable style of grate-bars may be employed, as will be deemed most convenient or advantageous.

E represents a circular pan, adapted to be snugly fitted into the open top of the body A, said pan being provided with a central flue, F, to allow of the escape of the smoke from the fire below, and also to provide a suitable draft for the same.

A cone-shaped hood, G, having a circular sleeve, $b$, is adapted to be fitted over the flue F to prevent the escape of sparks from the apparatus, as shown in the figure.

The construction of my invention being as already described, it will be observed that in the operation of the same a suitable fire is kindled upon the perforated plate D, a draft being furnished from the opening B, the pan E fitted into the top of the apparatus, and supplied with a suitable fumigating substance, such as sulphur, tobacco, &c., and the cone-shaped hood fitted over the central flue F, and the apparatus thus arranged placed under beds or in other places inhabited by vermin, for destroying and exterminating the same. By arranging the pan containing the fumigating substance over the fire, the full strength of the fumes are secured with but little waste of the material, which would not be the case were the same placed directly in the fire, which would rapidly consume without throwing off much smoke.

I am aware of the patent granted to C. L. Fewell, June 3, 1873, No. 139,562, in which a covered conical pan with central flue is shown, in connection with a stove and distributing-spout, to eject steam upon the insects to be destroyed; but,

Having thus described my invention, what I claim as new and useful is—

The combination of the chamber A, provided with draft-opening B and perforated plate D, with the pan E, having central flue F, and cone-shaped hood G, substantially as and for the purpose specified.

In testimony that I claim the foregoing as my own invention I affix my signature in presence of two witnesses.

FRANCIS HANSON.

Witnesses:
RICHARD SCOTT,
S. H. HANSON.